Oct. 20, 1925.
W. FERRIS
HYDRAULIC TRANSMISSION
Filed March 24, 1924
1,558,003
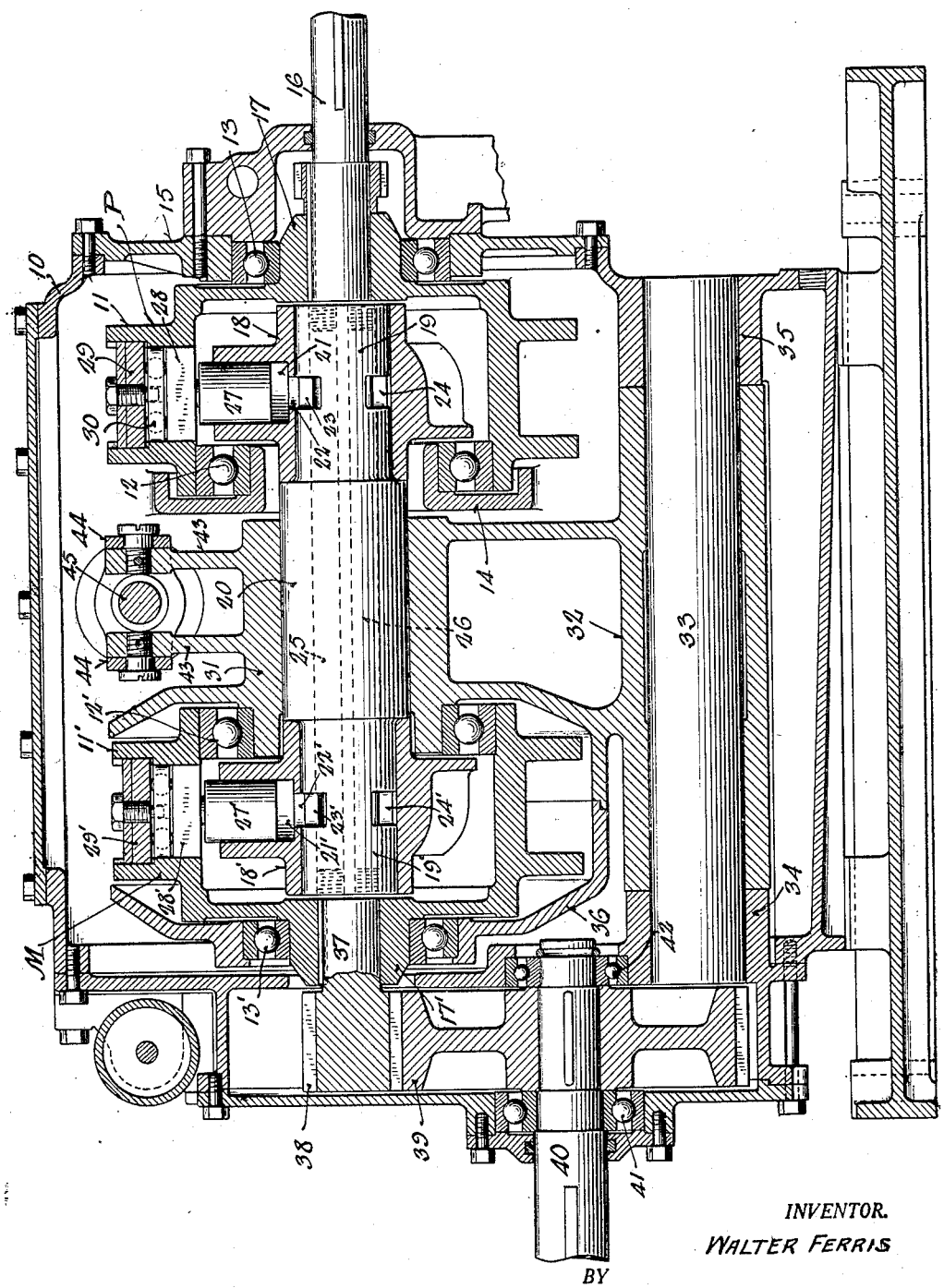
INVENTOR.
WALTER FERRIS
BY
*Ralph W. Brown*
ATTORNEY.

Patented Oct. 20, 1925.

1,558,003

UNITED STATES PATENT OFFICE.

WALTER FERRIS, OF MILWAUKEE, WISCONSIN, ASSIGNOR TO THE OILGEAR COMPANY, OF MILWAUKEE, WISCONSIN, A CORPORATION OF WISCONSIN.

HYDRAULIC TRANSMISSION.

Application filed March 24, 1924. Serial No. 701,354.

*To all whom it may concern:*

Be it known that I, WALTER FERRIS, a citizen of the United States, residing at Milwaukee, in the county of Milwaukee and State of Wisconsin, have invented a certain new and useful Improvement in Hydraulic Transmissions, of which the following is a full, clear, concise, and exact description, reference being had to the accompanying drawings, forming a part of this specification.

This invention relates to hydraulic transmissions.

One object of the present invention is the provision of a hydraulic transmission having a novel combination and arrangement of parts rendering it better adapted for installation as a unit in various commercial applications.

Other more specific objects and advantages will hereinafter appear from the following description of an illustrative embodiment thereof.

The single figure of the drawing is a vertical sectional view of a hydraulic transmission constructed in accordance with the present invention.

The transmission shown comprises a casing 10 enclosing a pump P and hydraulic motor M connected by a closed hydraulic circuit to be hereinafter described. The construction of the pump is substantially identical with that of the motor. Both are of the rotary, radial piston type, such as described in the patent to William E. Magie and Walter Ferris, No. 1,485,986, issued March 4, 1924. The pump comprises a cage 11 mounted for rotation about a fixed axis in spaced bearings 12 and 13. Bearing 12 is supported by a fixed rail 14 extending horizontally across the casing and bearing 13 is carried by a plate 15 removably fixed to and closing one end of the casing. The cage 11 is driven by a shaft 16 keyed to the hub 17 thereof.

Within the cage 11 is a rotary cylinder barrel 18 fitted for rotation upon one end 19 of a pintle 20. The cylinder barrel 18 is formed with a radial series of cylinder bores 21, each provided with a port 22 adapted to register successively with ports 23 and 24 formed in the upper and lower surfaces of the pintle end 19 during rotation of the cylinder barrel thereon. Ports 23 and 24 communicate, respectively, with upper and lower passages 25 and 26 extending longitudinally of the pintle. A piston 27 is fitted for reciprocation in each bore 21. Each piston is connected with a crosshead 28 extending normal thereto and adapted to coact with one of a series of reaction plates 29 tangentially disposed about the periphery of the rotating cage 11. A load transmitting roller bearing 30 between each crosshead 28 and reaction plate 29 maintains these members in parallelism so that the cylinder barrel 18 is rotated by and at the same angular velocity as the cage 11.

The arrangement is such that when the pintle 20 is in a neutral position, such that the axis of rotation of the cylinder barrel is substantially coincident with the axis of rotation of the cage 11, rotation of the cage causes the piston and cylinders to travel idly about the axis without relative reciprocation therebetween. Under these conditions, pump displacement is zero. When the pintle 20 is shifted horizontally in either direction, however, from this neutral position, rotation of the cage causes the pistons to reciprocate in their cylinders, due to the eccentric relation of the cage and cylinder barrel. Under this condition, the cylinders, during the upper half of their travel, either deliver fluid to or receive fluid from the upper pintle passages 25 through the port 23, and during the lower half of their travel either receive fluid from or deliver fluid to the pintle passages 26 through the port 24. Assuming that the speed and direction of rotation of the pump cage 11 is constant, the rate and direction of fluid flow in the passages 25 and 26 is dependent upon the horizontal distance and direction that the pintle is shifted from the neutral position. Since pumps of this type are now old and well known in the art, further description of the construction or operation thereof is deemed unnecessary.

In the transmission shown, the pintle 20 is fixed in an upright frame 31 having an extended bearing sleeve 32 rockably fitted upon a horizontal shaft 33 fixed in the bottom of the casing 10 and extending substantially parallel with the pintle 20. The shaft is shown secured at its ends in fixed bearings 34 and 35 in the end walls of the casing. A cradle 36 is rigidly connected with and supported by the frame 31. The motor cage 11′, which is substantially a duplicate of the pump cage 11, is mounted for rotation in spaced bearings 12' and 13', fixed in the cradle 36. These bearings are eccentrically disposed with respect to the pintle 20, so that the axis of rotation of the motor cage 11' is permanently offset horizontally from the axis of the pintle. The motor also includes a cylinder barrel 18' fitted for rotation on the end 19' of the pintle and provided with a radial series of cylinder bores 21' cooperating with pistons 27'. The pistons are provided with cross heads 28' cooperating with tangential reaction plates 29' in the cage in the same manner as described in connection with the pump. Each cylinder bore 21' is provided with a port 22' adapted to communicate successively with the upper and lower pintle passages 25 and 26 through pintle ports 23' and 24', respectively.

A stub shaft 37 is keyed to and carried by the hub 17' of the motor cage 11'. A pinion 38 on this shaft meshes with a gear 39 keyed to a driven shaft 40. The driven shaft is journaled in bearings 41 and 42 fixed in the end wall of the casing so that the axis of rotation of the gear 39 is not far from the axis of the shaft 33. The pinion 38 and gear 39 are always in mesh, providing a flexible driving connection between the motor cage 11' and the driven shaft 40, permitting the entire motor to swing horizontally with the pintle supporting frame 31. The pinion and gear shown also provide a speed reduction between the relatively high speed motor and driven shaft.

The operation of the motor is reversely similar to that of the pump. The cylinder bores 21', during the upper half of their travel about the pintle end 19', communicate with the upper pintle passages 25 through port 23', and during the lower half of their travel communicate with the lower pintle passages 26 through port 24'. Due to the permanent eccentricity of the motor cage 11' with respect to the cylinder barrel 18', fluid delivered under pressure from the pump to the motor through pintle passages 25 causes rotation of the motor in one direction, fluid discharged from the motor returning to the pump through the other pintle passages 26. Rotation of the motor is reversed or the speed thereof varied by reversing or varying the rate of flow in the passages 25 and 26. As above pointed out, this is accomplished by horizontally adjusting the pintle 20 with respect to the axis of rotation of the pump cage 11.

In this instance, the position of the pintle is regulated by a slight rocking of the frame 31 upon the shaft 33. Although various means may be employed for that purpose, the frame shown is provided with a pair of upstanding ears 43 connected through links 44 with a plunger 45 hydraulically actuated and controlled by mechanism substantially identical with that described in my copending application, Serial No. 483,468, filed July 9, 1921.

In practice, the driving and driven shafts 16 and 40, since they are mounted to rotate about fixed axes, may be directly connected, respectively, with the prime mover and the machine to be driven. During operation the working fluid flowing from the pump to the motor and back to the pump passes through the pintle 20 which is free from joints that might lead to leakage losses. The speed and direction of rotation of the motor is regulated by rocking the pintle supporting frame 31 upon its shaft 33. This adjustment effects a variation in pump displacement by varying the relative position of the pintle end 19 and the pump cage 11. Since, however, the motor cage 11' is also carried by the frame 31, a definite offset relation is maintained between the pintle end 19' and the motor cage so that motor displacement remains constant. The pinion 38 driven by the motor cage 11' remains in mesh with the gear 39 on the driven shaft 40 during adjustment of the frame 31 and provides for a reduction in speed between the motor and driven shaft.

Various changes may be made in the embodiment of the invention hereinabove described, without departing from or sacrificing any of the advantages of the invention as defined in the appended claims.

I claim:

1. In a hydraulic transmission the combination of a variable displacement pump, a hydraulic motor driven thereby, an adjustable support for said motor, and a member connected with said pump and movable with said support for varying pump displacement.

2. In a hydraulic transmission the combination of a variable displacement pump, a hydraulic motor driven thereby, a rockable frame for supporting said motor, and a member connecting said pump and motor and movable with said frame for varying pump displacement.

3. In a hydraulic transmission the combination of a variable displacement pump, a hydraulic motor driven thereby, a member providing a hydraulic connection between said pump and motor, and a support for said motor and member movable to vary pump displacement.

4. In a hydraulic transmission the combination of a radial cylinder variable displacement pump, a radial cylinder motor, a member extending from the center of the pump to the center of the motor providing a hydraulic driving connection therebetween, and a support for said motor and member movable to vary pump displacement.

5. In a hydraulic transmission the combination of a radial cylinder variable displacement pump, a radial cylinder motor, and means for varying pump displacement without varying motor displacement, said means comprising a rigid member extending from the center of the pump to the center of the motor and providing a hydraulic connection therebetween, and means for shifting said member.

6. In a hydraulic transmission the combination of a variable displacement pump, a hydraulic motor driven thereby, a rigid member extending from said pump to said motor and providing a hydraulic connection therebetween, and means for shifting said member relative to said pump to vary pump displacement and for maintaining a definite relation between said member and motor to maintain motor displacement constant.

7. In a selfcontained hydraulic transmission unit the combination of a casing, a variable displacement pump therein, a hydraulic motor therein, a member extending from said pump to said motor and providng a hydraulic connection therebetween, an adjustable support for said motor and member movable to vary pump displacement, a drive shaft for the pump, a shaft driven by the motor and gears between said motor and driven shaft maintaining a driving connection therebetween during adjustment of said support.

8. In a selfcontained hydraulic transmission unit, the combination of a casing, fluid impelling means in said casing comprising a pair of coacting rotary members, fluid actuated means in said casing comprising a pair of coacting rotary members, a hydraulic circuit between said means, a drive shaft for said first named means, a shaft driven by said last named means, and gears between one of said shfts and one of said rotary members permitting adjustment thereof to vary the displacement of one of said means.

In witness whereof, I hereunto subscribe my name this 1st day of February, 1924.

WALTER FERRIS.